(12) United States Patent
Chang et al.

(10) Patent No.: US 9,329,640 B2
(45) Date of Patent: May 3, 2016

(54) LAPTOP COMPUTER

(71) Applicant: Quanta Computer Inc., Taoyuan Shien (TW)

(72) Inventors: I-Wen Chang, Taoyuan Shien (TW); Yung-Sheng Nian, New Taipei (TW); Bing-Chang Shih, Taoyuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 97 days.

(21) Appl. No.: 14/495,308

(22) Filed: Sep. 24, 2014

(65) Prior Publication Data

US 2015/0301564 A1  Oct. 22, 2015

(30) Foreign Application Priority Data

Apr. 16, 2014 (TW) ............................. 103206611 U

(51) Int. Cl.
  *G06F 1/16* (2006.01)
(52) U.S. Cl.
  CPC ............ *G06F 1/1679* (2013.01); *G06F 1/1616* (2013.01); *G06F 1/1643* (2013.01); *G06F 1/1681* (2013.01)
(58) Field of Classification Search
  CPC combination set(s) only.
  See application file for complete search history.

(56) References Cited

U.S. PATENT DOCUMENTS

| | | | | | |
|---|---|---|---|---|---|
| 5,325,984 | A | * | 7/1994 | Ady | B65D 43/165 220/817 |
| 5,481,430 | A | * | 1/1996 | Miyagawa | G06F 1/1618 16/223 |
| 5,666,694 | A | * | 9/1997 | Slow | G06F 1/1618 16/308 |
| 6,006,243 | A | * | 12/1999 | Karidis | G06F 1/1616 361/679.27 |
| 7,652,873 | B2 | * | 1/2010 | Lee | E05B 65/006 248/917 |
| 9,244,535 | B2 | * | 1/2016 | Bates | G06F 3/0219 |
| 2004/0155861 | A1 | * | 8/2004 | Jackson, III | G06F 1/1632 345/156 |
| 2007/0291447 | A1 | * | 12/2007 | Nakajima | G06F 1/162 361/679.26 |
| 2011/0252601 | A1 | * | 10/2011 | Lin | G06F 1/1681 16/280 |
| 2014/0355196 | A1 | * | 12/2014 | Hashimoto | G06F 1/1632 361/679.27 |
| 2015/0309539 | A1 | * | 10/2015 | Kamphuis | G06F 1/1681 361/679.27 |

* cited by examiner

*Primary Examiner* — Lisa Lea Edmonds
(74) *Attorney, Agent, or Firm* — Rabin & Berdo, P.C.

(57) ABSTRACT

A laptop computer includes a base, a touch screen, a first hinge structure and a second hinge structure. The first hinge structure is pivotally connected with a side of the base. The second hinge structure is pivotally connected with the first hinge structure. The second hinge structure includes a locking part. The locking part detachably fastens to the touch screen. When the locking part fastens to the touch screen and the angle between the touch screen and the base is within 0 degree and a predetermined angle, the second hinge structure rotates relative to the first hinge structure. When the locking part fastens to the touch screen and the angle between the touch screen and the base is larger than the predetermined angle, the first hinge structure and the second hinge structure rotate synchronously relative to the base.

10 Claims, 12 Drawing Sheets

LAPTOP COMPUTER

RELATED APPLICATIONS

This application claims priority to TW Application Number 103206611, filed Apr. 16, 2014, which is herein incorporated by reference.

BACKGROUND

1. Technical Field

The present disclosure relates to laptop computers. More particularly, the present disclosure relates to pivoting structures of laptop computers.

2. Description of Related Art

With the great development of the touch technology, the display screens of a growing number of electronic devices are equipped with touch function. Even for the laptop computers already equipped with a keyboard or a touch pad, display screens operable by touch technology are also gradually developed. In this way, the user of the laptop computer can touch the desktop of the display with his finger and drag the objects directly, for instance, to move the cursor or the icon on the desktop.

Nevertheless, at present, the operation mode of the general laptop computers does not facilitate for the use of touch function. In other words, when the user wants to operate the icons on the touch screen by fully utilizing the touch mode, the keyboard or the touch pad of the laptop computer will instead cause an inconvenience to the user in the use of the touch screen.

SUMMARY

A technical aspect of the present disclosure provides a laptop computer which can solve the problem in the prior art.

According to an embodiment of the present disclosure, a laptop computer includes a base, a touch screen, a first hinge structure and a second hinge structure. The first hinge structure is pivotally connected with a side of the base. The second hinge structure is pivotally connected with the first hinge structure. The second hinge structure includes a locking part. The locking part detachably fastens to the touch screen. When the locking part fastens to the touch screen and the angle between the touch screen and the base is within 0 degree and a predetermined angle, the second hinge structure rotates relative to the first hinge structure. When the locking part fastens to the touch screen and the angle between the touch screen and the base is larger than the predetermined angle, the first hinge structure and the second hinge structure rotate synchronously relative to the base.

The laptop computer in the embodiments of the present disclosure mentioned above has a variety of usage modes, such as the general laptop mode and the touch operation mode. When the user wants to operate the icons on the touch screen or drag the objects by fully utilizing the touch operation mode, the touch screen can be turned to the back of the base of the laptop computer. Or, the touch screen can be detached from the laptop computer, so as to avoid the keyboard or the touch pad on the base of the laptop computer from affecting the operation of the touch screen.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
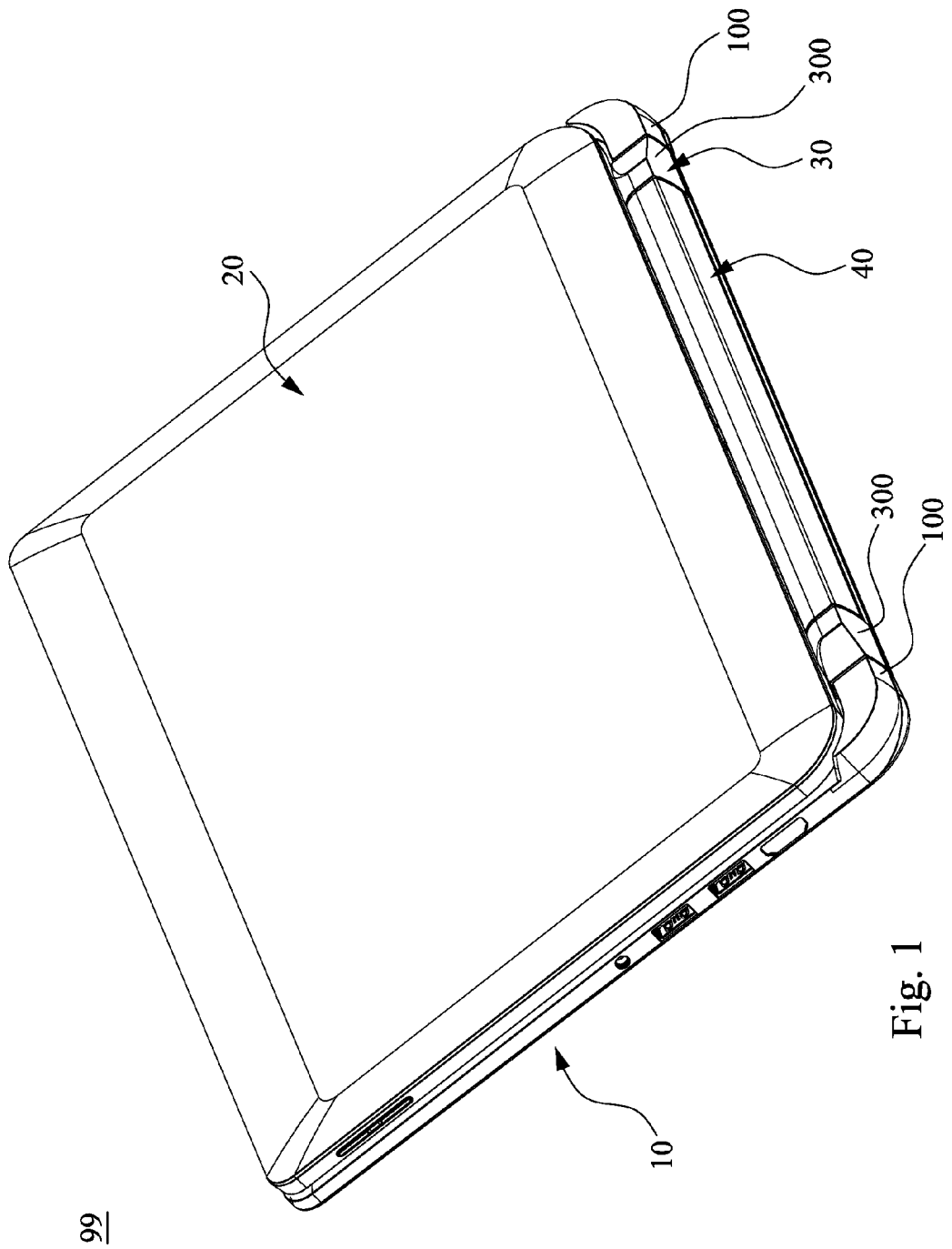
FIG. 1 is an assembly of a laptop computer according to an embodiment of the present disclosure.

Drawings will be used below to disclose a plurality of embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

First of all, in the embodiments below, a laptop computer with a touch screen is disclosed. The touch screen of this laptop computer can be completely turned to the back of the base of the laptop computer, or detached from the base of the laptop computer. In addition, in the embodiments below, if the angle between the touch screen and the base is mentioned, it is referred to the angle between the touch surface of the touch screen and the surface of the base with a keyboard. In some of the embodiments, this angle is within 0 degree to 360 degree.

Figure 2:
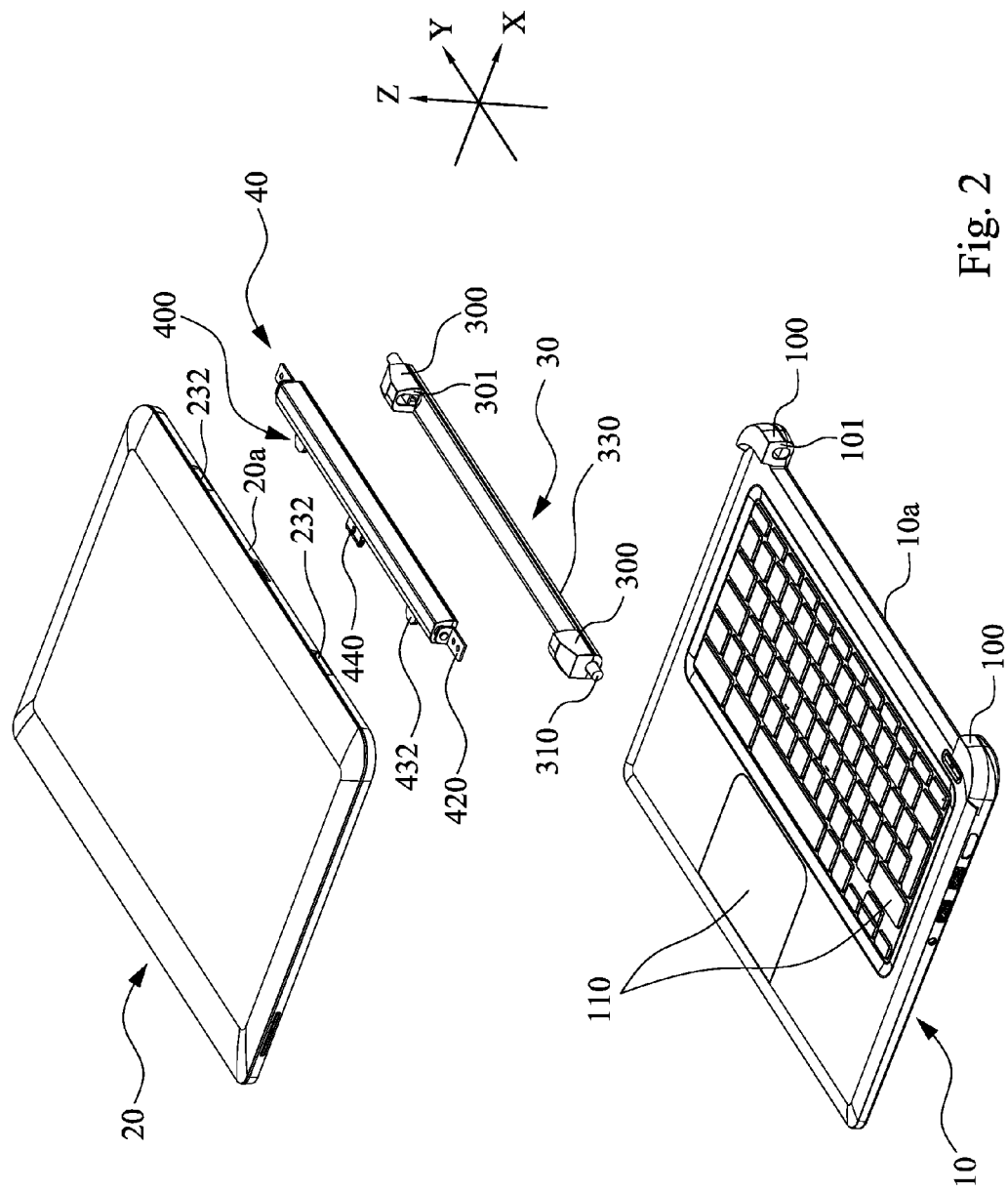
FIG. 2 is an exploded view of a laptop computer according to an embodiment of the present disclosure.

Please refer to FIG. 1 and FIG. 2. FIG. 1 and FIG. 2 are respectively an assembly and an exploded view of a laptop computer according to an embodiment of the present disclosure. As shown in the figures, the laptop computer 99 includes a base 10, a touch screen 20, a first hinge structure 30 and a second hinge structure 40. The first hinge structure 30 is pivotally connected with a side 10a of the base 10. The second hinge structure 40 is pivotally connected with the touch screen 20. The second hinge structure 40 can rotate relative to the first hinge structure 30, such that the angle between the touch screen 20 and the base 10 is within 0 degree and a predetermined angle. At this point, the user can operate the laptop computer 99 by the traditional mode. When the angle between the touch screen 20 and the base 10 is equal to the predetermined angle, the first hinge structure 30 and the second hinge structure 40 can rotate synchronously relative to the base 10, such that the angle between the touch screen 20 and the base 10 becomes larger than the predetermined angle. In a specific embodiment, the predetermined angle can be 180 degree, and the angle between the touch screen 20 and the base 10 can rotate to a maximum of 360 degree. At this point, the touch screen 20 can completely turn to the back of the base 10. The user can fully utilize the touch mode to operate the touch screen 20, enhancing the convenience of the operation of the touch screen 20.

To be more specific, the base 10 can have a pivoting part 100. The pivoting part 100 protrudes from the side 10a of the base 10 substantially towards the direction X. As shown in FIG. 1, two pivoting parts 100 are respectively located at the two ends of the side 10a of the base 10. The first hinge structure 30 is embedded between the two first pivoting surfaces 101. In other words, the two ends of the first hinge structure 30 can be respectively connected on the two first pivoting surfaces 101, and the first hinge structure 30 can rotate relative to the first pivoting surface 101 of the base 10.

Then, please stay on FIG. 1 and FIG. 2. The second hinge structure 30 is pivotally connected with the first hinge structure 30 and the second hinge structure 14 includes a locking part 400. The locking part 400 is detachably connected with the touch screen 20. In other words, the user can connect the touch screen 20 to the second hinge structure 40 according to the actual usage conditions, or detach the touch screen 20 from the second hinge structure 40. On the other hand, when the locking part 400 fastens to the touch screen 20 and the angle between the touch screen 20 and the base 10 is within 0 degree and the predetermined angle, the second hinge structure 40 rotates relative to the first hinge structure 30.

To be more specific, the first hinge structure 30 can include a bottom cover 330 and a rotating shaft cover 300. In FIG. 1, two rotating shaft covers 300 are respectively located at the two ends of the bottom cover 330. The two rotating shaft covers 300 respectively have a second pivoting surface 301 (FIG. 2) facing each other. The second hinge structure 40 can be embedded between the two second pivoting surfaces 301. In other words, the two ends of the second hinge structure 40 can respectively be pivotally connected with the two pivoting surfaces 301. In this way, when the angle between the touch screen 20 and the base 10 is within 0 degree and the predetermined angle, the second hinge structure 40 can rotate relative to the second pivoting surface 301 of the first hinge structure 30.

In a specific embodiment, the torque value of the second hinge structure 40 can be less than that of the first hinge structure 30, such that when the second hinge structure 40 rotates, the first hinge structure 30 will not be towed by the second hinge structure 40 to rotate.

In a specific embodiment, the base 10 can further include an input part 110 (such as keyboard or touch pad, etc). When the angle between the touch screen 20 and the base 10 is larger than the predetermined angle, the input function of the input part 110 can automatically shut down. At this point, the user can operate the icons on the touch screen 20 by fully utilizing the touch operation mode, and it is not necessary to worry about that the input function of the input part 110 will affect the operation.

In another embodiment, the second hinge structure 40 can further include an electricity connecting part 400. When the touch screen 20 fastens to the locking part 400 of the second hinge structure 40, the electricity connecting part 440 can be electrically connected between the base 10 and the touch screen 20.

Figure 3:
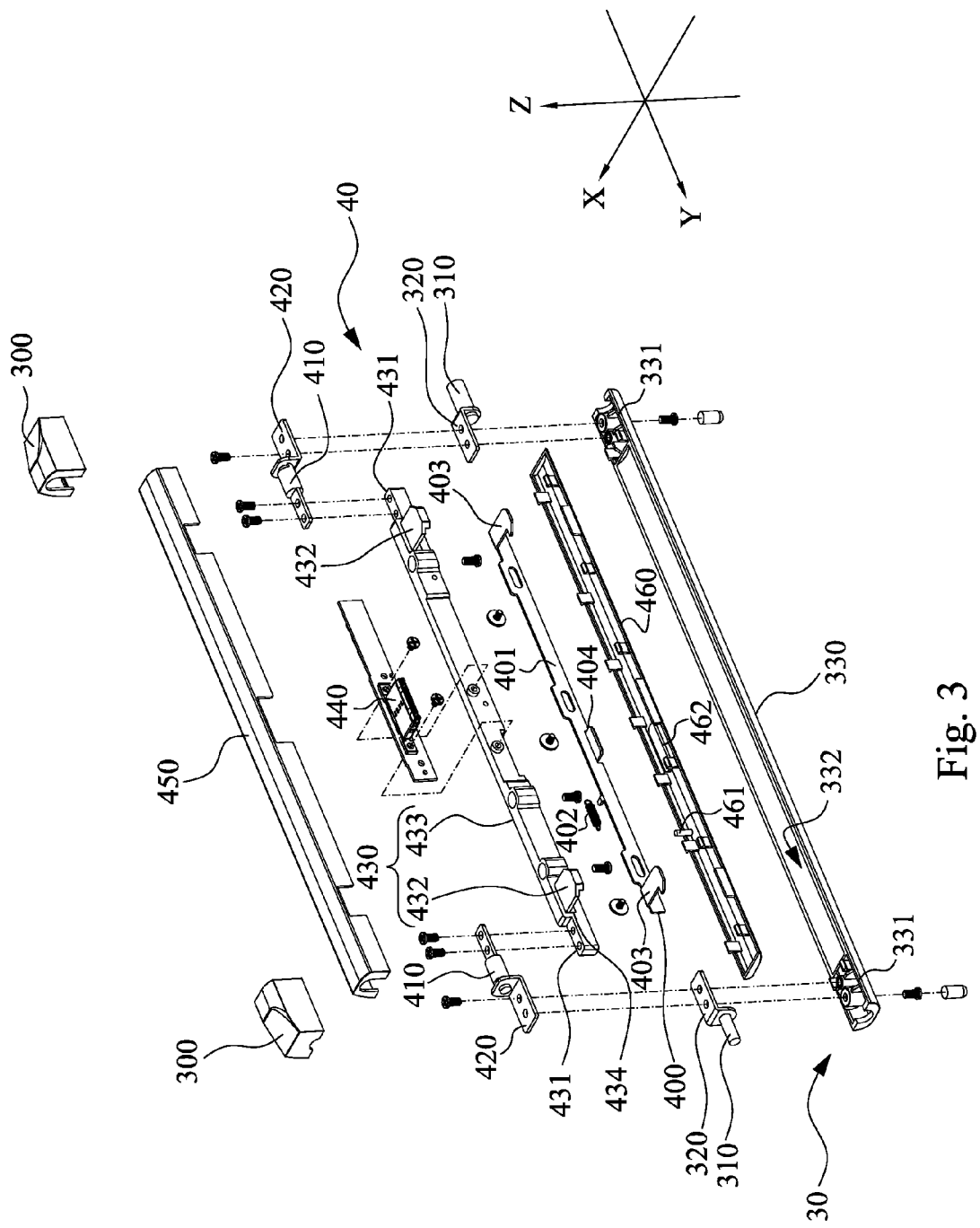
FIG. 3 is an exploded view of the first hinge structure and the second hinge structure of the present disclosure from the view angle X of FIG. 1.

The detailed structure and the operation mechanism of the first hinge structure 30 and the second hinge structure 40 are illustrated in detail below, such that the present disclosure can be clearly and easily understood. Please refer to FIG. 3. FIG. 3 is an exploded view of the first hinge structure 30 and the second hinge structure 40 of the present disclosure from the view angle X of FIG. 1. As shown in FIG. 3, the first hinge structure 30 includes two first rotating shafts 310, two first fixing parts 320, two rotating shaft covers 300 and a bottom cover 330. The quantity of the elements as cited above is only illustrative and does not limit the present disclosure.

Please refer to FIG. 2 and FIG. 3. One end of the first rotating shaft 310 is connected with the first pivoting surface 101, and the other end of the first rotating shaft 310 is connected with the first fixing part 320. The first fixing part 320 can be connected with the second hinge structure 40. In this embodiment, the first rotating shaft 310 can be fixed on the first fixing part 320 and pivotally connected with the first pivoting surface 101. However, this does not limit the present disclosure. In other embodiments, the first rotating shaft 310 can be pivotally connected with the first fixing part 320 or pivotally connected with the first pivoting surface 101, according to the actual usage conditions, and drives the first hinge structure 30 to rotate relative to the first pivoting surface 101 of the base 10.

Please stay on FIG. 3. The two ends 331 of the bottom cover 330 and the two first fixing parts 320 can respectively have a plurality of locking holes. When assembling the first hinge structure 30, the locking hole of the first fixing part 320 and the locking hole of the end 331 of the bottom cover 330 can be aligned. Then, the first fixing parts 320 are fastened to the ends 331 of the bottom cover 330 by screws. Afterwards, the rotating shaft cover 330 covers the first fixing part 320 and part of the first rotating shaft 310 (please refer to FIG. 2), and part of the first rotating shaft 310 exposed from the rotating shaft cover 300 can be connected or pivotally connected with the first pivoting surface 101 in FIG. 2. It should be noted that, the present disclosure does not limit to fastening by screws. Other similar fasteners can also be used for fastening.

Please stay on FIG. 3. The second hinge structure 40 can include two second rotating shafts 410, two second fixing parts 420, one main frame 430, one locking part 400, one electricity connecting part 440, one upper cover 450 and one lower cover 460. The second rotating shafts 410, the main frame 430, the locking part 400, the electricity connecting part 440 can be sandwiched between the upper cover 450 and the lower cover 460. The second fixing part 420 is connected with the second rotating shaft 410, and is located outside the upper cover 450 and the lower cover 460. The quantity of the elements as cited above is only illustrative and does not limit the present disclosure.

The second fixing part 420 on the second hinge structure 40 can be fixed and connected with the first fixing part 320. To be more specific, the second fixing part 420 can have a plurality of screw holes. One end of the second fixing part 420 is pivotally connected with the second rotating shaft 410, and sandwiched inside the upper cover 450 and the lower cover 460. The screw holes of the second fixing part 420 are exposed outside the upper cover 450 and the lower cover 460. When assembling the first hinge structure 30 and the second hinge structure 40, the screw hole of the first fixing part 320, the screw hole of the second fixing part 420 and the screw hole of the end 331 of the bottom cover 330 can be aligned with each other. Then, the first fixing part 320, the second fixing part 420 and the bottom cover 330 are fastened and connected by fasteners like screws.

It should be noted that, the bottom cover 330 of the first hinge structure 30 has a groove 332. The groove 332 can be located between the two ends 331 of the bottom cover 330. The shape of the lower cover 460 of the second hinge structure 40 and the shape of the groove 332 can be complementary, such that when the first fixing part 320 and the second fixing part 420 are fastened and connected, the lower cover 460 is just accommodated inside the groove 332.

Please stay on FIG. 3. One end of the second rotating part 410 can be fixed on the main frame 430. The other end of the second rotating part 410 is pivotally connected with the second fixing part 420. To be more specific, one end of the second rotating shaft 410 fixed on the main frame 430 can be designed with a plurality of screw holes. Meanwhile, the end 431 of the main frame 430 also has corresponding screw holes, which can be aligned with the screw holes of the second rotating shaft 410. Then, the second rotating shaft 410 and the main frame 430 are fastened and connected by fasteners like screws. In the practical application of the product, the main frame 430 can be in a shape of a long plate, sandwiched between the upper cover 450 and the lower cover 460. This can increase the stability during the rotation of the second hinge structure 40.

Consequently, please refer to FIG. 2 and FIG. 3. In an embodiment, the main frame 430 can include a positioning plate 432 and a main plate 433. The positioning plate 432 is disposed on the main plate 433 and protrudes outside the surface of the main plate 433 towards the direction –X. After the upper cover 450 and the lower cover 460 are assembled, the main plate 433 of the main frame 430 is sandwiched inside the upper cover 450 and the lower cover 460. The positioning plate 432 is exposed outside the upper cover 450 and the lower cover 460. In contrast, the side 20a of the touch screen 20 can have groove 232. When the locking part 400 fastens to the touch screen 20, the positioning plate 432 exposed outside the upper cover 450 and the lower cover 460 can be aligned to the groove 232 of the side 20a of the touch screen 20, such that the positioning plate 432 can be limited inside the groove 232. This can increase the stability during the connection of the touch screen 20 and the second hinge structure 40.

Moreover, please stay on FIG. 3. The locking part 400 of the second hinge structure 40 includes a plate 401, an elastic piece 402 and a hook 403. The hook 403 is connected with the plate 401 and protrudes from the surface of the plate 401 towards the direction –X. After the upper cover 450 and the lower cover 460 are assembled, the plate 401 is sandwiched inside the upper cover 450 and the lower cover 460. The hook 403 is exposed outside the upper cover 450 and the lower cover 460. The hook 403 is used for fastening the touch screen 20. On the other hand, the main plate 433 of the main frame 430 has an opening 434 at a side in the direction –Z of the positioning plate 432. The hook 403 of the locking part 400 can pass through the opening 434 and is closely disposed with the positioning plate 432 of the main frame 430. At this point, when the touch screen 20 and the second hinge structure 40 are connected, both the hook 403 and the positioning plate 432 are located in the groove 232 of the side 20a of the touch screen 20. The inner wall of the groove 232 can be made deeper to facilitate the hook 403 to fasten to the touch screen 20, such that the touch screen 20 can be fixed on the second hinge structure 40.

Figure 4:
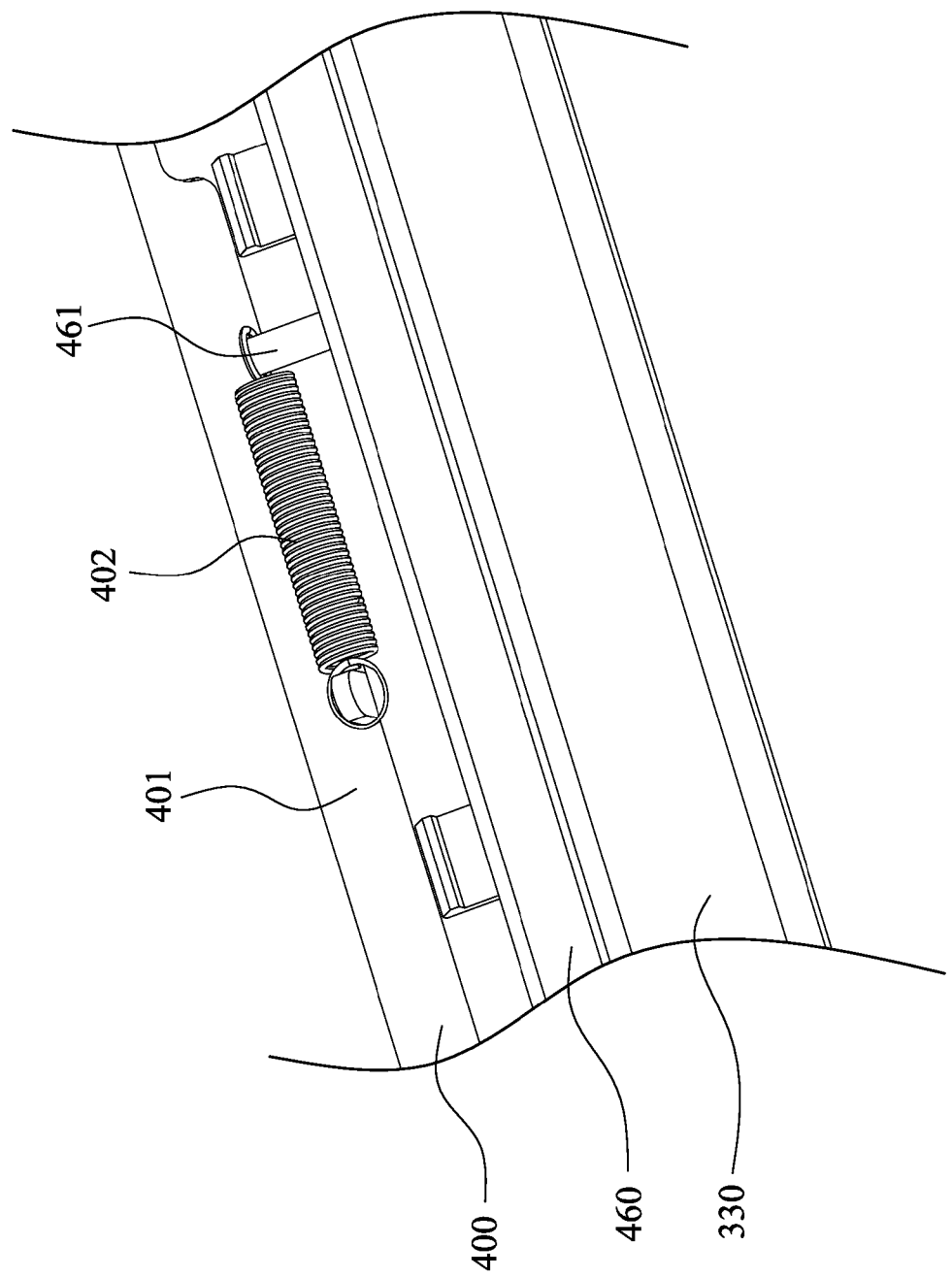
FIG. 4 is an assembly of the first hinge structure and the second hinge structure from the view angle X of FIG. 3, and the upper cover is omitted in FIG. 4.
Figure 5:
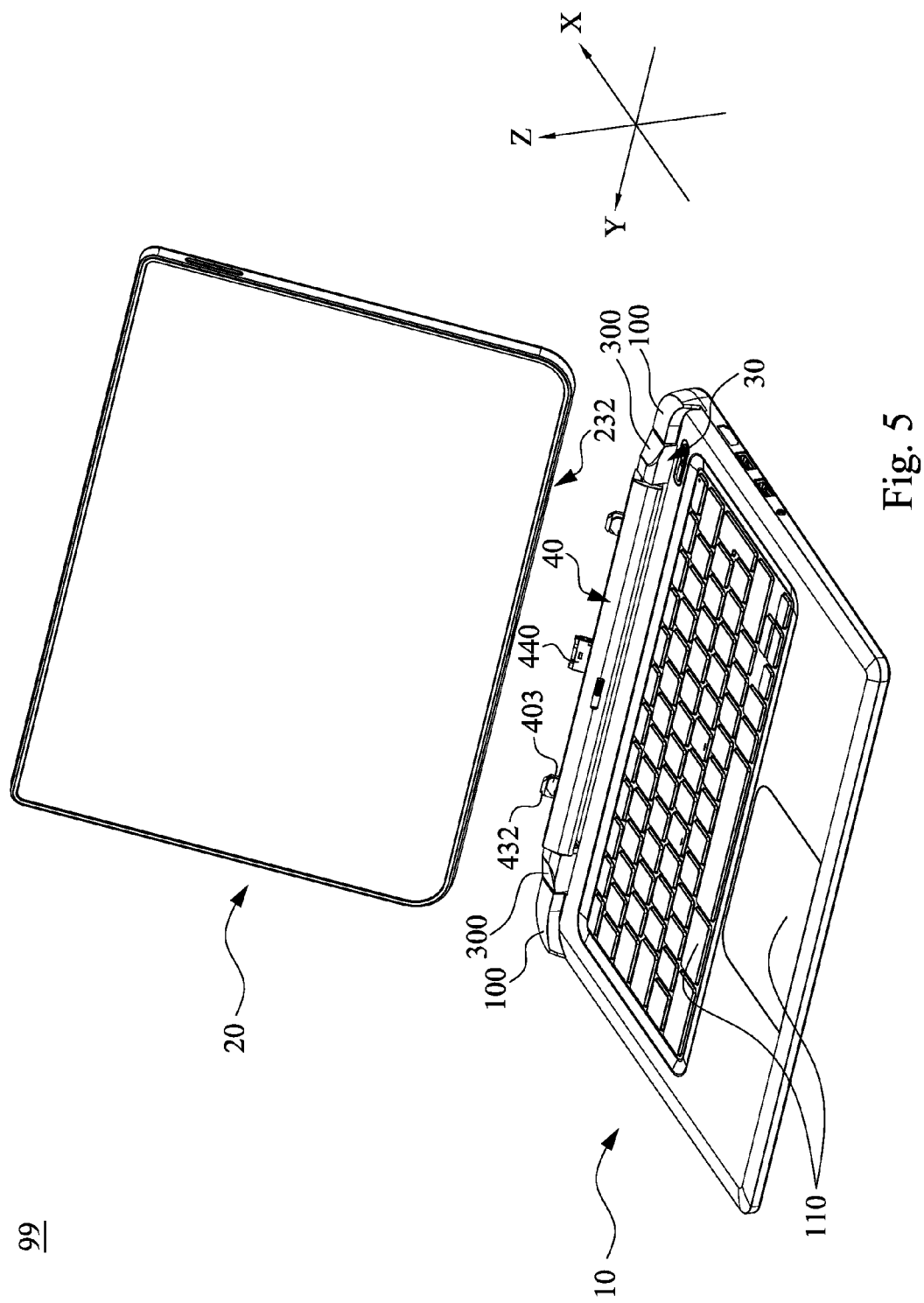
FIG. 5 is a state diagram of the detachment of the touch screen of the laptop computer of FIG. 1.
Figure 6:
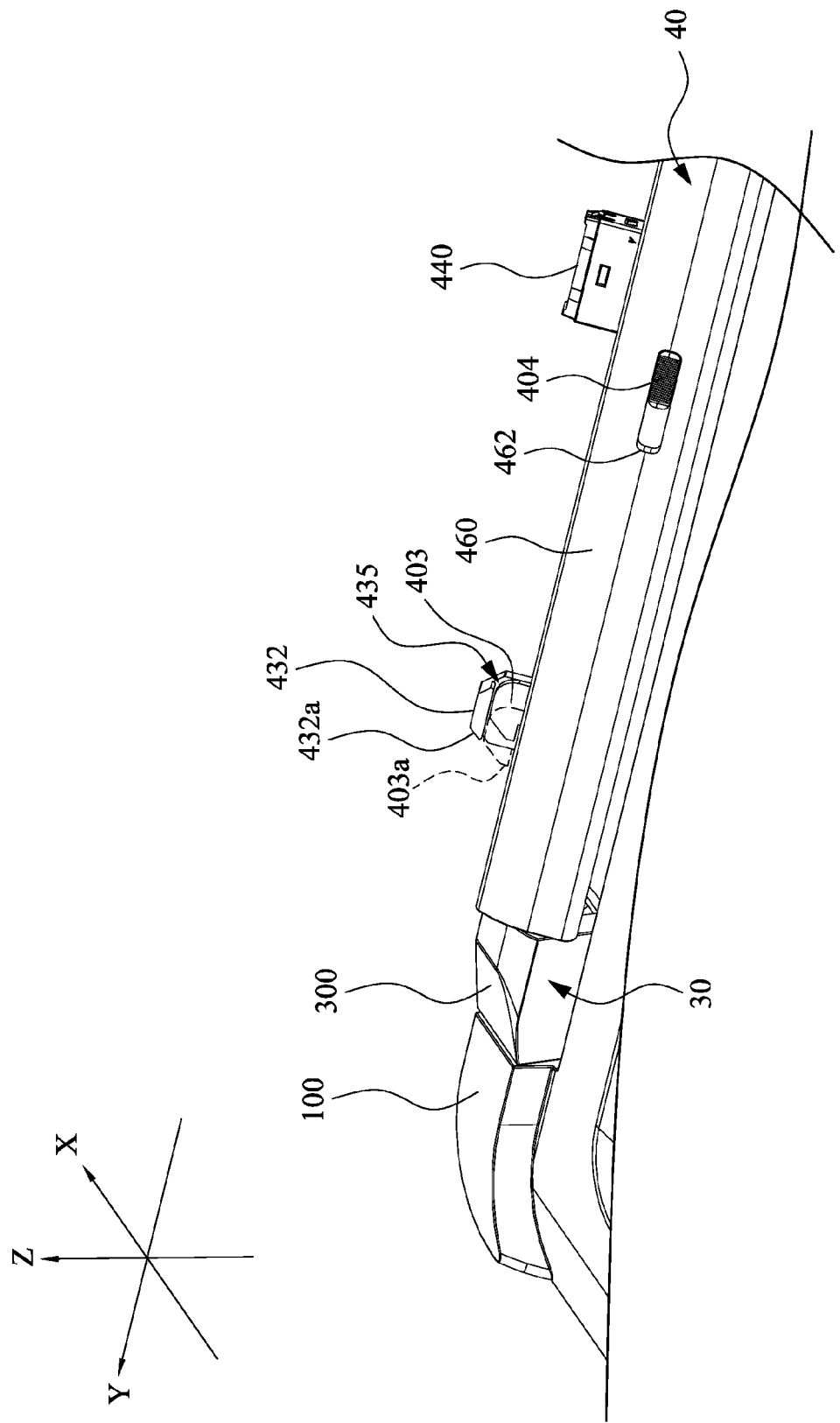
FIG. 6 is a partially enlarged view of the locking part of FIG. 5.

Consequently, the operation mechanism of the elastic piece 402 of the locking part 400 and the locking part 400 are to be further illustrated. Please refer to FIG. 3 to FIG. 6. FIG. 4 is an assembly of the first hinge structure 30 and the second hinge structure 40 from the view angle X of FIG. 3, and the upper cover 450 is omitted in FIG. 4. FIG. 5 is a state diagram of the detachment of the touch screen 20 of the laptop computer 99 of FIG. 1. FIG. 6 is a partially enlarged view of the locking part of FIG. 5.

First of all, as shown in FIG. 4, one end of the elastic piece 402 can be connected on the surface of the plate 401, the other end can be connected with a protruding piece 461 of the lower cover 460. In an embodiment, the protruding piece 461 can be of a cylindrical shape. In this way, through the stretching or compressing of the elastic piece 402, the plate 401 of the locking part 400 can move relative to the lower cover 460, such that the hook 403 also moves accordingly. Thus, the hook 403 can selectively fasten to the groove 232 of the touch screen 20.

Furthermore, please refer to FIG. 3 and FIG. 6. The plate 401 of the locking part 400 can further include a push and pull piece 404. The lower cover 460 further includes an opening 462. During the assembly of the upper cover 450 and the lower cover 460, the opening 462 and the push and pull piece 404 face each other. After the upper cover 450 and the lower cover 460 are sandwiched between the plate 401, the push and pull piece 404 can be limited in the opening 462.

Moreover, please refer to FIG. 5 and FIG. 6. As shown in the figures, when the angle between the touch screen 20 of the laptop computer 99 and the base 10 is within 0 degree and a predetermined angle (such as 180 degree), the user can make the hook 403 fully aligned inside the positioning plate 432 (as the solid line in FIG. 6) by pushing the push and pull piece 404 towards the direction –Y. To be more specific, the surface of the positioning plate 432 can recess with a sliding groove 435. At this point, the hook 403 can be completely accommodated inside the sliding groove 435. Thus, the touch screen 20 can be detached from the second hinge structure 40 without any hindrance. At this point, the elastic piece 402 is in a compressed status as shown in FIG. 4. Similarly, when the touch screen 20 is bound on the second hinge structure 40, the positioning plate 432 is located in the groove 232. If the user does not apply an external force on the push and pull piece 404 in the direction –Z, the elasticity of the elastic piece 402 can drive the hook 403 to fasten to the touch screen 20 towards the direction Y. At this point, the location of the hook 403 is as the location of the dashed line as shown in FIG. 6.

In an embodiment, when the user does not apply an external force on the push and pull piece 404 in the direction –Y, the hook 403 at the position of the dashed line and the positioning plate 432 can respectively have inclined surfaces 403a, 432a aligning with each other. The inclined surfaces 403a, 432a can be the guiding surface during the combination of the touch screen 20 and the second hinge structure 40. In other words, when the touch screen 20 is to be installed to the second hinge structure 40, the edge of the groove 232 of the touch screen 20 can first slide along the inclined surface 432a. When the edge of the groove 232 of the touch screen 20 touches the inclined surface 403a, the hook 403 can be pushed by the touch screen 20 towards the direction –Y. When the positioning plate 432 is completely accommodated inside the groove 232 of the touch screen 20, the hook 403 can move towards the direction Y and fasten to the touch screen 20 by the elasticity of the elastic piece 402.

The following drawings will further demonstrate the status of the specific applications of the laptop computer 99 in the embodiments as mentioned above.

First of all, through the first hinge structure 30 and the second hinge structure 40 of the embodiments mentioned above, the drawings below will respectively demonstrate three usage modes of the laptop computer 99: the laptop mode, the detached tablet mode and the rotation tablet mode.

Figure 7:
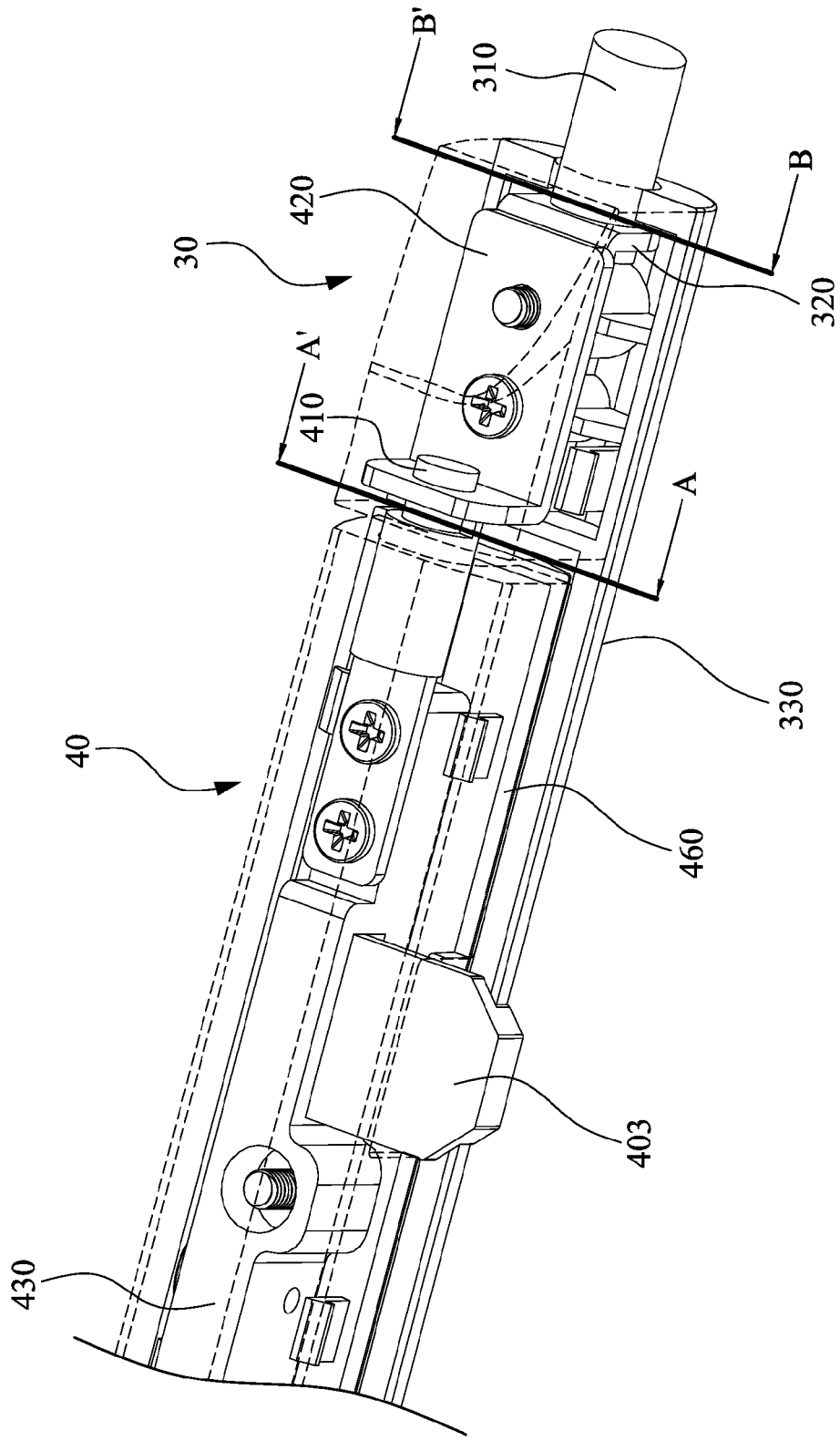
FIG. 7 is an internal perspective view of the first hinge structure and the second hinge structure of FIG. 1.
Figure 8:
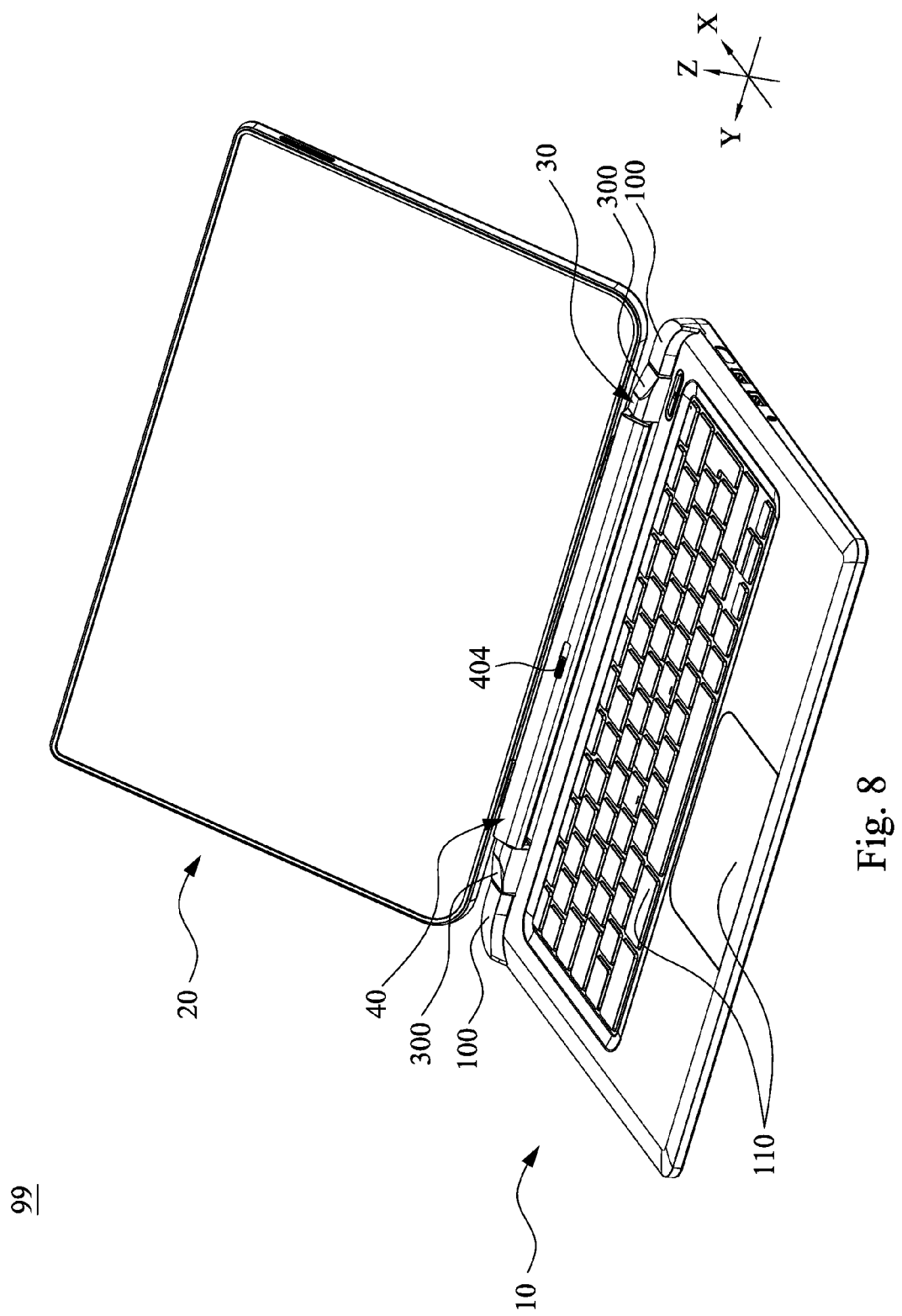
FIG. 8 is a schematic diagram of the laptop computer of FIG. 1 in the laptop mode.

Please refer to FIG. 7 and FIG. 8. FIG. 7 is an internal perspective view of the first hinge structure 30 and the second hinge structure 40 of FIG. 1. FIG. 8 is a schematic diagram of the laptop computer 99 of FIG. 1 in the laptop mode. As shown in the figures, after the second hinge structure 40 is assembled to the first hinge structure 30, the first rotating shaft 310 is located between the second rotating shaft 410 and the pivoting part 100 of the base 10. When the laptop computer 99 is to be operated by the laptop mode, the second rotating shaft 410 can rotate for about 120 degree. At this point, the first rotating shaft 310 remains stationary (since the torque value of the second hinge structure 40 is less than the torque value of the first hinge structure 30), and it becomes the laptop mode as shown in FIG. 8. At this point, the user can operate the icons or objects on the touch screen 20 by fully utilizing the input part 110 of the base 10.

Under the laptop mode in FIG. 8, if it is to be switched to the detached tablet mode, the push and pull piece 404 can be pushed towards the direction −Y. Then, the touch screen 20 can be detached from the second hinge structure 40, as shown in FIG. 5.

Figure 9:
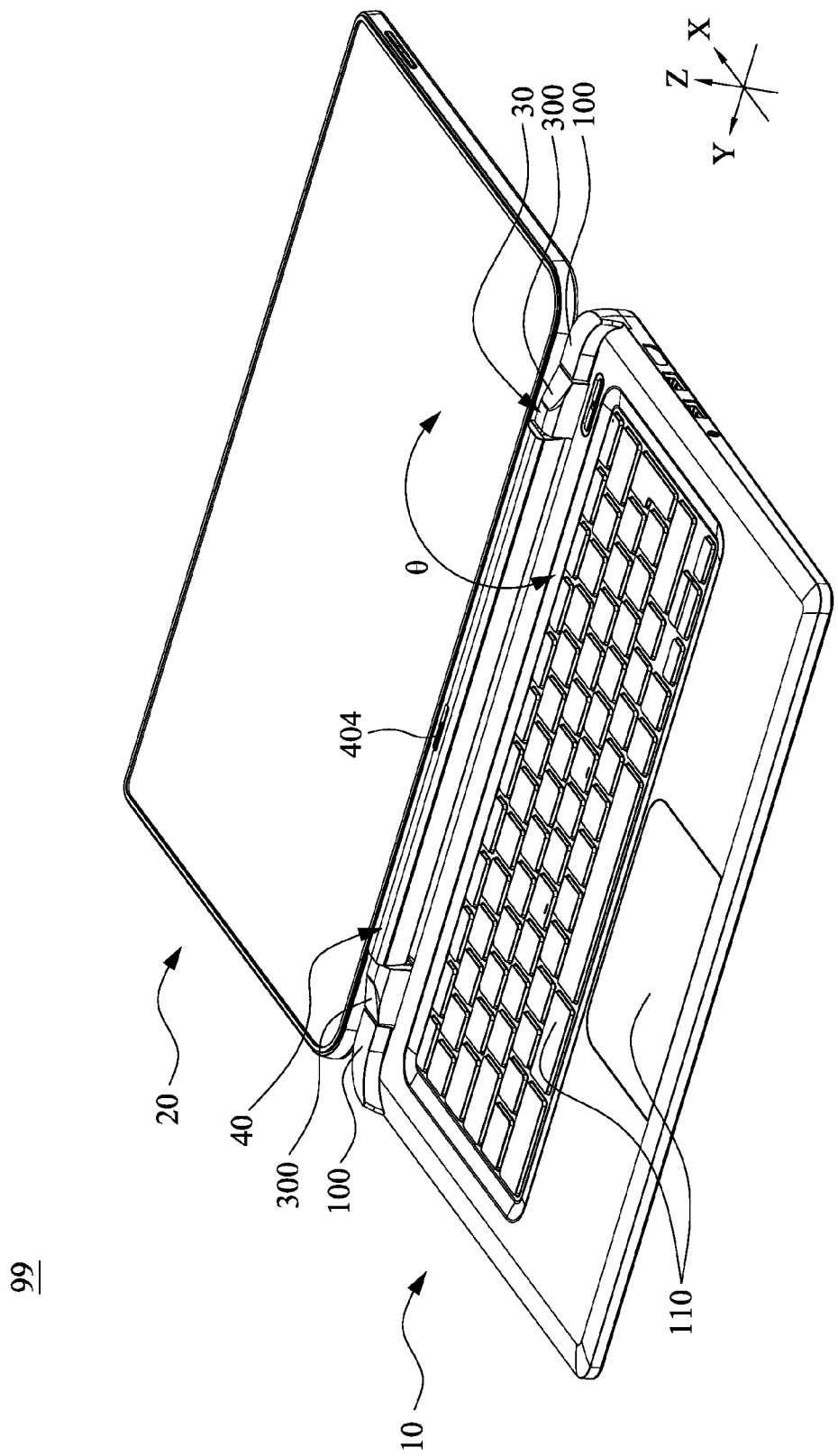
FIG. 9 is a schematic diagram of the angle between the touch screen and the base of the laptop computer of FIG. 1 equal to the predetermined angle.
Figure 10:
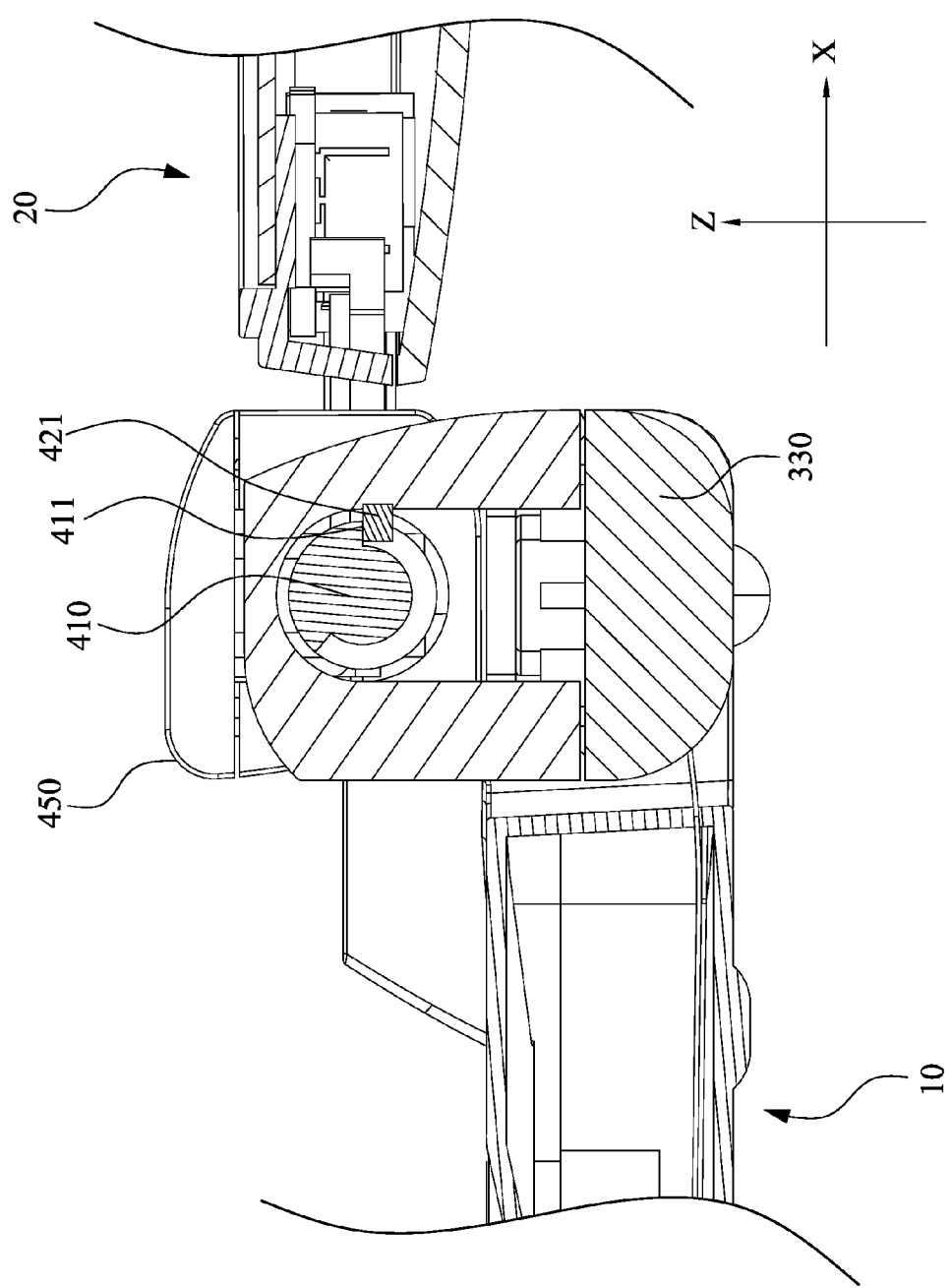
FIG. 10 to FIG. 12 are continuous schematic diagrams showing the laptop computer according to an embodiment of the present disclosure rotates to the tablet mode.
Figure 11:
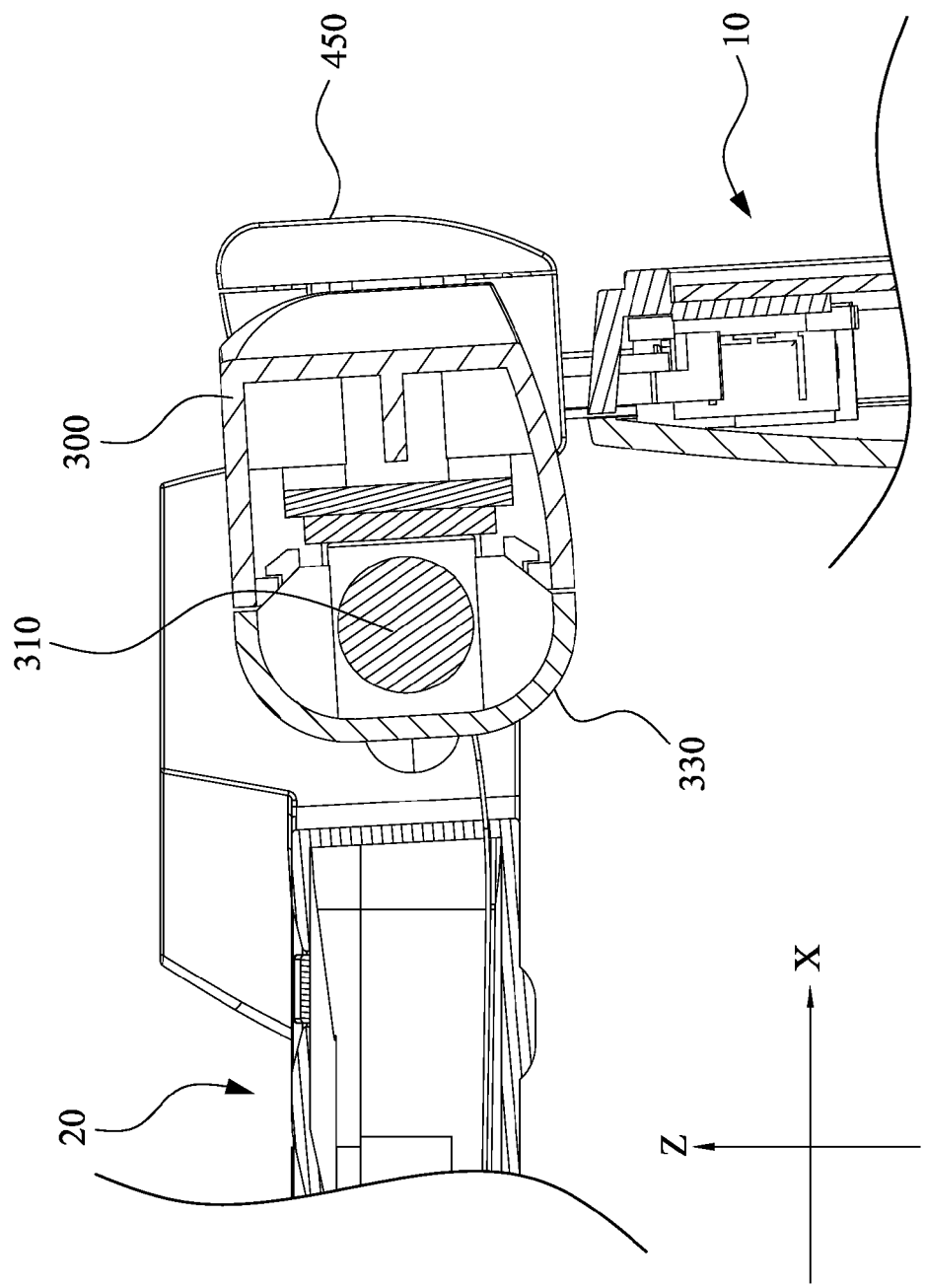
Figure 12:
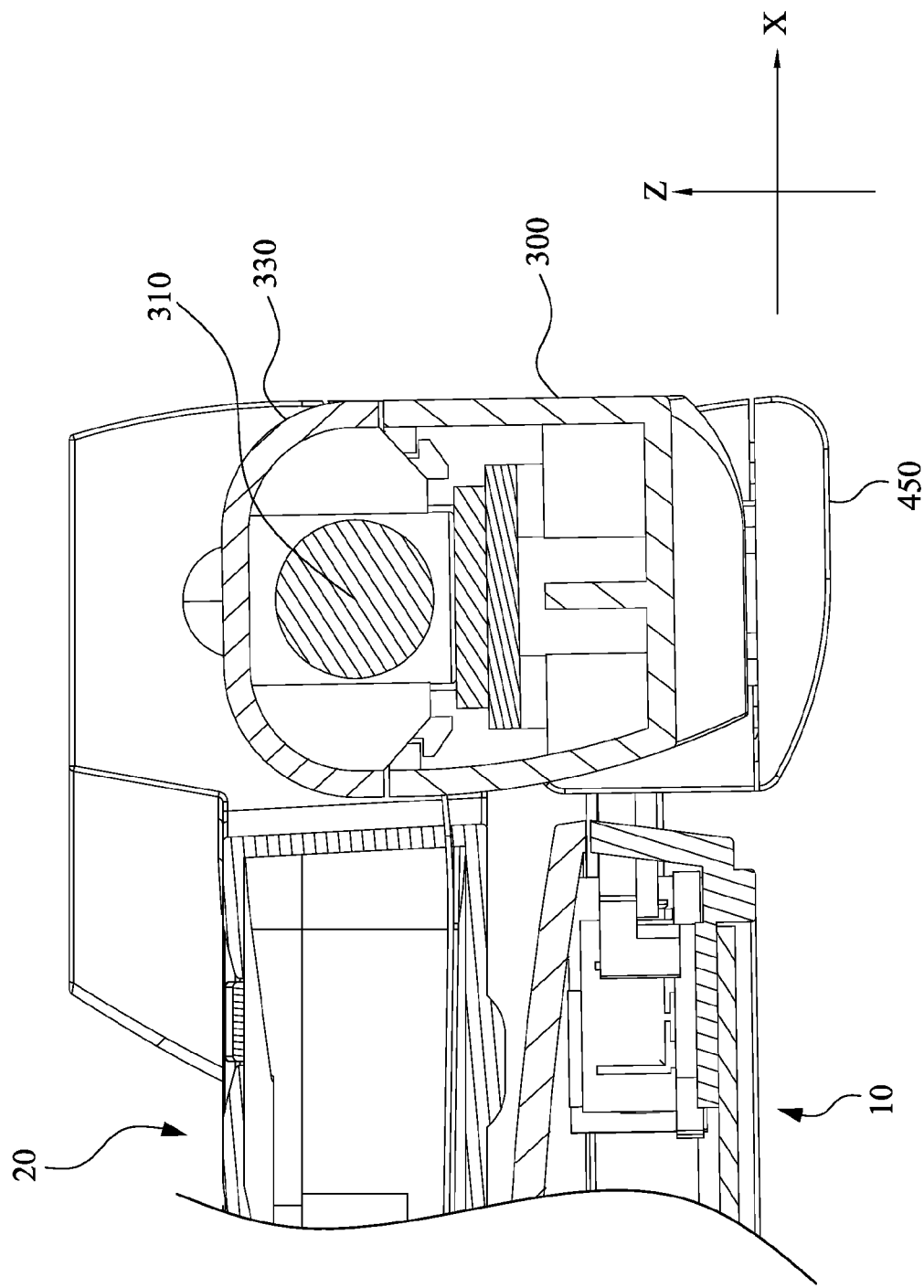

Consequently, please refer to FIG. 7 and FIG. 9 to FIG. 12. FIG. 9 to FIG. 12 are continuous schematic diagrams showing the laptop computer 99 according to an embodiment of the present disclosure rotates to the tablet mode. FIG. 10 is the sectional view of the section line AA' in FIG. 7. FIG. 11 and FIG. 12 are the sectional views of the section line BB' in FIG. 7.

First of all, before the complete transformation to the rotation tablet mode, the angle between the touch screen 20 of the laptop computer 99 and the base 10 has to rotate to the position of the predetermined angle θ, as shown in FIG. 9 and FIG. 10. It is worth to mention that, in some of the embodiments, the second rotating shaft 410 of the second hinge structure 40 can include the stopping surface 411, and the second fixing part 420 of the second hinge structure 40 can further include stopping piece 421. When the angle between the touch screen 20 and the base 10 is equal to the predetermined angle θ, the stopping piece 421 and the stopping surface 411 abut against each other.

In an embodiment, the stopping piece 421 and the second fixing part 420 can be an integrally shaped structure, but this does not limit the present disclosure. The stopping piece 421 can also be disposed on the second fixing part 420 by the way of adhesion. The position of the stopping piece 421 can be used to adjust the magnitude of the predetermined angle θ. To be more specific, in FIG. 10, after the second rotating shaft 410 has rotated for about 180 degree (the predetermined angle θ is 180 degree), the stopping surface 411 of the second rotating shaft 410 and the stopping piece 421 abut against each other. If the position of the stopping piece 421 moves towards the direction Z in FIG. 10, the stopping piece 421 will get close to the upper cover 450, making the predetermined angle θ less than 180 degree.

Moreover, please refer to FIG. 11 and FIG. 12. After the angle between the touch screen 20 and the base 10 matches with the predetermined angle θ, since the stopping surface 411 of the second rotating shaft 410 and the stopping piece 421 abut against each other, the first hinge structure 30 can be naturally rotated. In addition, please refer to FIG. 11, when the first hinge structure 30 rotates more than 90 degree relative to the base 10, the touch screen 20 starts to face away from the input part 110 of the base 10. At this point, the input function of the input part 110 can be automatically shut down. The input part 110 can be the carrier support, placed on a carrier surface (such as a table), so as to facilitate the user to operate the touch screen 20 by fully utilizing the touch mode. Then, please refer to FIG. 12. When the first hinge structure 30 has rotated more than about 180 degree relative to the base 10, the touch screen 20 can be completely turned to the back of the input part 110 for the user to operate. At this point, the flexibility of operation of the laptop computer 99 is increased, allowing the user to place the touch screen 20 in a horizontal or an up right manner according to the actual usage requirement.

In summary, in the embodiments of the present disclosure as mentioned above, the two hinge structures at a side of the base of the laptop computer can be used, such that the touch screen can be turned to the back of the base. Moreover, one of the hinge structures of the laptop computer can be disposed with the locking part. The touch screen can be fastened to or detached from the locking part, so as to increase the selectivity of the overall operation of the laptop computer.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A laptop computer, comprising:
a base;
a touch screen;
a first hinge structure pivotally connected with a side of the base; and
a second hinge structure pivotally connected with the first hinge structure, the second hinge structure comprising a locking part, the locking part detachably fastening to the touch screen;
wherein when the locking part fastens to the touch screen and the angle between the touch screen and the base is within 0 degree and a predetermined angle, the second hinge structure rotates relative to the first hinge structure, when the locking part fastens to the touch screen and the angle between the touch screen and the base is larger than the predetermined angle, the first hinge structure and the second hinge structure rotate synchronously relative to the base.

2. The laptop computer of claim 1, wherein the first hinge structure comprises a first rotating shaft and a first fixing part, the first fixing part connecting with the second hinge structure, the side of the base protruding a pivoting surface, the first rotating shaft connecting between the first fixing part and the pivoting surface.

3. The laptop computer of claim 2, wherein the second hinge structure comprises a second rotating shaft, a second fixing part and a main frame, the second fixing part being fixed to the first fixing part, an end of the second rotating shaft being fixed to the main frame, another end of the second rotating shaft pivotally connecting with the second fixing part.

4. The laptop computer of claim 3, wherein the first rotating shaft is located between the second rotating shaft and the base.

5. The laptop computer of claim 3, wherein the main frame comprises a positioning plate, a side of the touch screen having a groove, wherein when the locking part fastens to the touch screen, the positioning plate is located in the groove.

6. The laptop computer of claim 5, wherein the second hinge structure comprises an upper cover and a lower cover, the second rotating shaft and the main frame being sandwiched between the upper cover and the lower cover, the positioning plate protruding outside the upper cover and the lower cover.

7. The laptop computer of claim 6, wherein the locking part comprises:

a plate sandwiched between the upper cover and the lower cover;

an elastic piece, an end of the elastic piece connecting with the plate, another end of the elastic piece connecting with the lower cover; and a hook connected with the plate and protruding outside the upper cover and the lower cover, the hook and the positioning plate being closely disposed;

wherein when the positioning plate is in the groove, an elasticity of the elastic piece drives the hook to fasten the touch screen towards a predetermined direction.

8. The laptop computer of claim 3, wherein the second rotating shaft comprises a stopping surface, the second fixing part comprises a stopping piece, wherein when the angle between the touch screen and the base is equal to the predetermined angle, the stopping piece and the stopping surface abut against each other.

9. The laptop computer of claim 1, wherein when the angle between the touch screen and the base is within the predetermined angle and 360 degree, the first hinge structure and the second hinge structure rotate synchronously relative to the base.

10. The laptop computer of claim 1, wherein the second hinge structure further comprises an electricity connecting part electrically connected between the base and the touch screen.

\* \* \* \* \*